UNITED STATES PATENT OFFICE.

ADOLF BAEYER, OF MUNICH, GERMANY.

PROCESS FOR PRODUCING ARTIFICIAL INDIGO.

SPECIFICATION forming part of Letters Patent No. 233,459, dated October 19, 1880.

Application filed April 6, 1880. (Specimens.)

*To all whom it may concern:*

Be it known that I, ADOLF BAEYER, doctor of philosophy and professor of chemistry in the University of Munich, in the Empire of Germany, have invented a new and useful Improvement relating to Materials used in the Manufacture of Artificial Indigo, which improvement is fully set forth in the following specification.

This invention relates to the manufacture of orthonitrophenyloxyacrylic acid and to the process employed for this purpose.

In carrying out my invention I submit orthonitrocinnamic acid to the action of hypochlorous or hypobromous acids, by preference in their nascent condition. As an example of the manner in which I proceed, orthonitrocinnamic acid is dissolved in a solution of carbonate of soda, and afterward a current of chlorine is passed through the said solution until the chlorine appears in slight excess. After removing the excess of chlorine by means of sulphurous acid or otherwise, the mixture is strongly acidified by muriatic acid, filtered, if necessary, and the clear solution is repeatedly shaken with ether, in order to extract therefrom the orthonitrophenylchlorolactic acid, which, after evaporation of the solvent, is obtained in a solid state.

In an analogous manner orthonitrophenylbromolactic acid may be prepared by substituting bromine for chlorine in the above process.

By submitting either the orthonitrophenylchlorolactic acid or the orthonitrophenylbromolactic acid to the action of alcoholic potash, hydrochloric or hydrobromic acid, respectively, is eliminated, and in either case the resulting product is orthonitrophenyloxyacrylic acid.

The characteristics of orthonitrophenyloxyacrylic acid are the following: The said acid is a white crystalline solid, sparingly soluble in water. It is a strong organic acid, forming salts with alkalies and salifiable bases. Heated above its fusing-point decomposition ensues, accompanied by the production of gas and formation of indigo-blue.

Compounds analogous to the above-mentioned derivatives of orthonitrocinnamic acid may be obtained by employing in the above-described process homologues and substitution products of orthonitrocinnamic acid—such, for instance, as orthonitroparachlorocinnamic acid.

As above stated, the orthonitrophenyloxyacrylic acid is used in the manufacture of artificial indigo.

I do not claim in this application the production of orthonitrophenylchlorolactic acid, neither the production of orthonitrophenylbromolactic acid, those products being the subject-matters of separate applications for patents.

What I claim as new, and desire to secure by Letters Patent, is—

1. As a new article of manufacture, orthonitrophenyloxyacrylic acid, produced, substantially as described, by the reaction of a halogen, such as chlorine or bromine orthonitrocinnamic acid and alcoholic potash, or by any other means which will produce a like result.

2. The within-described process for producing orthonitrophenyloxyacrylic acid, by exposing orthonitrocinnamic acid to the action of hypochlorous or hypobromous acid, and then exposing the product obtained to the action of alcoholic potash, substantially in the manner set forth.

In testimony that I claim the foregoing I have hereunto set my hand and seal this 24th day of March, 1880.

ADOLF BAEYER. [L. S.]

Witnesses:
GUSTAV SIEGLE,
HEINRICH CARO.